United States Patent [19]

Akita et al.

[11] 4,438,384

[45] Mar. 20, 1984

[54] GENERATION INDICATING APPARATUS FOR VEHICLE ALTERNATORS

[75] Inventors: Yoshio Akita, Ichinomiya; Toshinori Maruyama, Kariya; Katsuya Muto, Okazaki, all of Japan

[73] Assignee: Nippondenso Co., Ltd., Kariya, Japan

[21] Appl. No.: 294,822

[22] Filed: Aug. 21, 1981

[30] Foreign Application Priority Data

Aug. 29, 1980 [JP] Japan ................... 55-119413

[51] Int. Cl.³ .............................................. H02J 7/16
[52] U.S. Cl. ......................................... 320/48; 322/99
[58] Field of Search ........................... 320/40; 322/99; 340/635

[56] References Cited

U.S. PATENT DOCUMENTS

| | | | |
|---|---|---|---|
| 3,944,905 | 3/1976 | Allport et al. | 322/99 X |
| 4,262,243 | 4/1981 | Mori et al. | 322/99 |
| 4,276,577 | 6/1981 | Gruson | 322/99 X |
| 4,360,773 | 11/1982 | Voss | 322/99 X |

*Primary Examiner*—William M. Shoop
*Attorney, Agent, or Firm*—Cushman, Darby & Cushman

[57] ABSTRACT

A generation indicating apparatus for a vehicle alternator in a generating and charging system includes an indicator lamp connected in series with an electric load and the series circuit of the indicator lamp and the electric load is connected to a battery through a key switch. A series circuit of an electric load drive transistor and an indicator lamp drive transistor is connected in parallel with the series circuit of the indicator lamp and electric load and a junction point between the indicator lamp and the electric load is connected through a line to a junction point between the two drive transistors. Either the load drive transistor or the lamp drive transistor is made conductive depending upon whether a voltage built up by the alternator has reached a predetermined level or not.

The generation indicating apparatus includes an abnormal voltage detecting circuit and an oscillator circuit, and when an abnormal voltage is detected on the line between the junction points of the indicator lamp circuit and the drive transistor circuit, depending on whether the alternator is in a generating condition or not, either the electric load drive transistor or the indicator lamp drive transistor is controlled by a pulse signal from the oscillator circuit to become conductive only an on period of the pulse signal. A current flowing through either of the drive transistors is limited and the abnormal voltage level on the line is lowered at each of succession of pulse signals to ensure the restoration of the drive transistors to a normal operation after the abnormal voltage is removed.

4 Claims, 8 Drawing Figures

GENERATION INDICATING APPARATUS FOR VEHICLE ALTERNATORS

BACKGROUND OF THE INVENTION

The present invention relates to generation indicating apparatus for vehicle alternators and more particularly to a generation indicating apparatus having a function of protecting a indicator lamp drive circuit.

Transistorized generation indicating apparatus are generally known in the art and this type of apparatus is designed so that an indicator lamp is turned on during the time interval between the closing of a key switch and the time that the generated voltage of an alternator reaches a predetermined value, thus indicating that the alternator is not generating. On the other hand, if an abnormal voltage is applied to the terminal (hereinafter referred to an L terminal) between the indicator lamp and the output end of a circuit for driving the indicator lamp due to short-circuiting of the indicator lamp, contact failure of the "L" terminal with a power supply circuit or the like causing erroneous application of the voltage from the power source or the L terminal being directly connected to the ground terminal, there is the danger of breaking a circuit element of a generation indicating circuit such as a transistor. Generation indicating circuits of the type having a protecting circuit for preventing such trouble have been proposed.

This type of protective circuit is so designed that the voltage at the L terminal is detected such that when the voltage at the "L" terminal becomes abnormal and exceeds a predetermined value during the indicating operation (where the alternator is not generating power and the indicator lamp is turned on) or the voltage at the L terminal becomes abnormal and lower than the predetermined value under the electric load driving condition (where the engine has started so that the alternator is generating an output voltage higher than a predetermined value and the indicator lamp is off), the indicating operation or the load driving is stopped and breaking of the transistor in the drive circuit is prevented. However, this type of protective circuit is disadvantageous in that it has no resetting function so that once an abnormal voltage has been detected and the generation indicating or load driving operation as been stopped, even if the abnormal voltage is eliminated and the normal condition is restored, it is not always possible to bring back to the former or normal operating condition.

SUMMARY OF THE INVENTION

It is the object of the present invention to provide a generation indicating apparatus for vehicle alternators so designed that when an abnormal voltage is applied between generation indicating means and the output end of its drive circuit, the generation indicating operation is stopped to prevent breaking of any circuit element and the former normal operating condition is restored upon removal of the abnormal voltage.

In accordance with the present invention, there is thus provided a generation indicating apparatus in which a drive circuit for turning an indicator lamp on or off is operated in response to the signal from a generation indicating circuit which detects whether the output voltage or an alternator has reached a predetermined value, whereby if an abnormal voltage detecting circuit detects the generation between the indicator lamp and the output end of the drive circuit of an abnormal voltage which is different from that which would be generated under the normal alternator nongenerating condition (the indicator lamp is on) or the normal alternator generating condition (the indicator lamp is off), the drive circuit or its output-stage driving transistor for controlling the turning on and off of the indicator lamp is switched from the on state to the "off" state thus preventing any excessively large current from flowing to the transistor and breaking it. In this case, the apparatus of this invention further comprises an oscillator circuit for generating a pulse signal having a predetermined pulse width, whereby when an abnormal voltage is detected, the driving transistor for controlling the turning on and off of the indicator lamp is not completely turned off but the transistor is controlled in such a manner that it is intermittently turned on and off in response to the pulse signal from the oscillator circuit. The pulse "on" time in each period of this pulse signal is selected great as compared with the "off" time so that the "on" time of the transistor is very short and the amount of current flow to the transistor is limited.

On the other hand, when the application of the abnormal voltage is eliminated and the normal operating condition is restored, it does not necessarily follow that the voltage between the indicator lamp and the output end of the drive circuit is restored to the normal or regular voltage. The reason is that since it is not infrequent that an electric load such as a relay for controlling the operation of a vehicle-mounted instrument is usually connected in series with the indicator lamp and that during the abormal condition the output-stage driving trnsistor of the drive circuit is mostly placed in the off state (it is completely held in the off state in the case of the prior art apparatus) thus causing the current from the battery power source to flow through the indicator lamp and the electric load, the voltage between the indicator lamp and the output end of the drive circuit assumes a value which is dependent on the impedance ratio between the indicator lamp and the electric load. However, in accordance with the present invention, the output-stage driving transistor of the drive circuit is controlled so as to be turned on and off such that due to the current flow during the "on" time of the transistor, in the nongenerating condition the voltage becomes lower than an abnormal voltage detecting level, whereas in the generating condition the voltage becomes higher than the abnormal voltage detecting level, and the voltage assumes its normal-condition value in either case, thus preventing the abnormal voltage detecting circuit from generating an abnormal voltage detection signal and controlling the drive circuit in accordance with the signal from a generation detecting circuit and thereby restoring the indicator lamp to the normal indicating condition (namely, the indicator lamp is turned on in the nongenerating condition and it is turned off in the generating condition). In other words, the abnormal voltage detecting circuit and the oscillator circuit serve both the protecting function and the reset function.

Thus, in accordance with the present invention, if any adnormal voltage which is different from the normal one is applied between the indicator means and the drive circuit output end for some reason or other, the indicating operation is rapidly stopped forcibly to prevent breaking of any circuit element of the drive circuit and the former normal operating condition is positively restored by the reset function in response to the elimination of the abnormal voltage.

DESCRIPTION OF THE PREFERRED EMBODIMENTS

The present invention will now be described in greater detail with reference to the illustrated embodiments.

Figure 1:
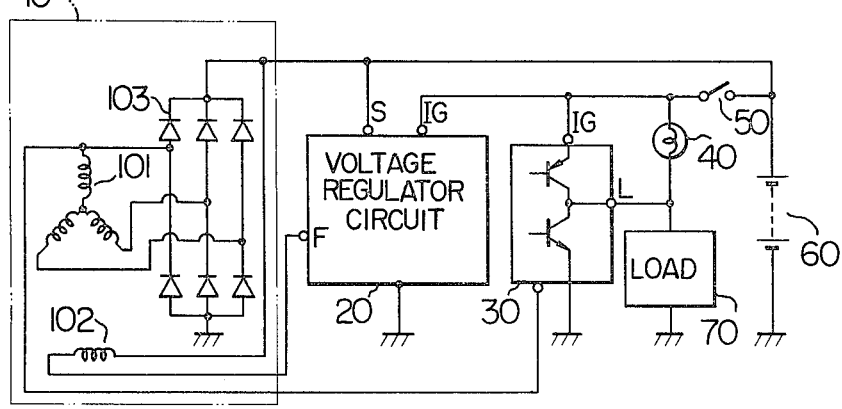
FIG. 1 is an overall block diagram of a charging system for vehicles.

Referring to FIG. 1 showing an overall circuit diagram of a charging system for automotive vehicles, numeral 10 designates an alternator comprising stator windings 101, a field winding 102 and a full-wave rectifier 103, whereby a rotor having the field winding 102 wound thereon is rotated by an engine so that a three-phase AC voltage generated in the stator windings 101 is full-wave rectified and a DC output is delivered. Numeral 20 designates a voltage regulator circuit of a known type whereby when a key switch 50 is closed, the alternator 10 is initially excited such that the initial excitation is stopped when the voltage generated by the alternator 10 in response to the starting of the engine rises and reaches a predetermined value and thereafter the current flow to the field winding 102 is intermittently controlled so as to maintain the generated voltage or the charged voltage of a battery 60 at a predetermined value (e.g., 14.5 V). Numeral 30 designates a generation indicating circuit which is connected via its IG terminal and the key switch 50 to the battery 60, receives at its P terminal the generated output of the alternator 10 and controls the ouput at its output terminal L in accordance with the input voltage at the P terminal. Numeral 40 designates an indicator lamp forming generation indicating means and adapted to be turned on or off in accordance with the output at the L terminal. Numeral 70 designates an electric load such as a relay for controlling the operation of other vehicle-mounted instrument, which is operated in the generating condition of the alternator where the output at the L terminal rises to a high potential and the indicator lamp 40 is turned off.

Figure 2:
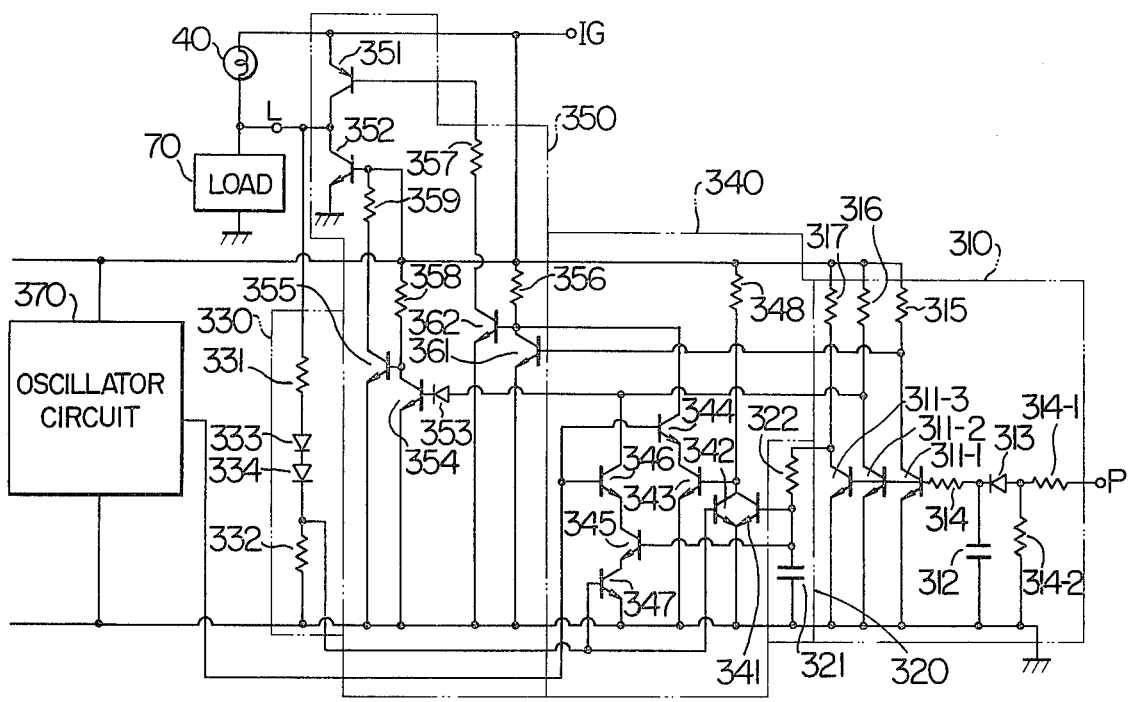
FIG. 2 is a circuit diagram of a generation indicating apparatus according to the present invention.
Figure 3:
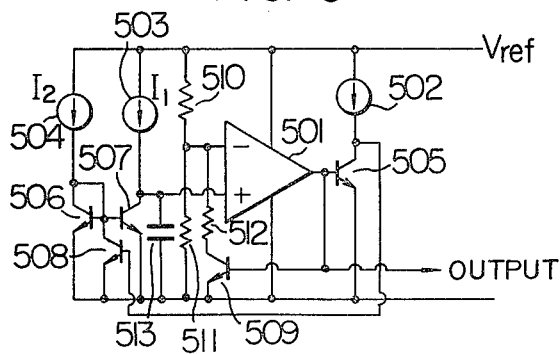
FIG. 3 is a circuit diagram of the oscillator circuit in the generation indicating apparatus of FIG. 2.
Figure 4:
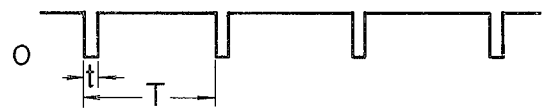
FIG. 4 is a waveform diagram for the output signal of the oscillator circuit.

FIG. 2 is a detailed circuit diagram of the generation indicating circuit 30. Numeral 310 designates a generation detecting circuit comprising a circuit including a capacitor 312, a diode 313 and resistors 314-1 and 314-2 for smoothing out the output voltage of the alternator 10 and transistors 311-1, 311-2 and 311-3 which are turned on when the P terminal voltage from the alternator 10 reaches a predetermined value. Numeral 320 designates a delay circuit comprising a capacitor 321 and a resistor 322 for transmitting the generating condition of the alternator 10 to the following stage with some delay. Numeral 330 designates an abnormal voltage detecting circuit comprising voltage dividing resistors 331 and 332 and diodes 333 and 334 which are connected between the L terminal and the ground to generate a voltage corresponding to the potential at the L terminal and which are operatively associated with transistors 346 and 347 of a control logic circuit 340 which will be described later such that the transistors 346 and 347 are turned on when the L terminal potential exceeds an abnormal voltage detecting level and the transistors 346 and 347 are turned off when the L terminal potential becomes lower than the detecting level, thus detecting the occurrence of an abnormal voltage. Numeral 340 designates the control logic circuit responsive to the signals from the generation detecting circuit 310, the delay circuit 320, the abnormal voltage detecting circuit 330 and an oscillator circuit 370 which will be described later so as to generate a signal for controlling a drive circuit 350, and the circuit comprises transistors 341, 342, 343, 344, 345, 346 and 347 and a resistor 348. In particular, the control logic circuit 340 is responsive to the signals from the abnormal voltage detecting circuit 330 and the oscillator circuit 370 to control the drive circuit 350 in such a manner that the circuit protecting function is performed when an abnormal voltage is applied to the L terminal and the resetting function for restoring the normal operating condition is performed when the abnormal voltage is eliminated. The drive circuit 350 is responsive to the signal from the control logic circuit 340 to operate the indicator lamp 40 and the electric load 70 and it comprises a transistor 351 for operating the electric load 70, a transistor 352 for operating the indicator lamp 40, and transistors 361, 362, 354 and 355, a diode 353 and resistors 356, 357, 358 and 359 for transmitting signals to the transistors 351 and 352, whereby in accordance with the generating condition of the alternator 10 one of the transistors 351 and 352 is turned on and the other is turned off and the state of the output at the L terminal is controlled to switch it a low potential or a high potential. The oscillator circuit 370 is constructed for example as shown in FIG. 3 and it generates a pulse signal of the waveform as shown in FIG. 4. This pulse signal is applied to the transistors 344 and 346 of the control logic circuit 340 so that during each period of the pulse signal or T seconds, the transistors are turned off only for the time of t seconds and they are turned on for the remaining time of (T−t) seconds. The time t is selected short, such as, 20 μsec and the period T is selected long or 3 msec, thus holding the transistors 344 and 346 in the on state for the most part. The oscillator circuit 370 serves the previously mentioned reset function to ensure the restoration from the abnormal operating condition to the normal operating condition.

Referring now to FIG. 3, the oscillator circuit 370 comprises a comparator 501 such that a reference voltage Vref is divided by a voltage divider comprising resistors 510 and 511 and switching between the insertion and removal of a resistor 512 connected in parallel with the voltage divider is effected by a transistor 509, thus applying the resulting reference voltage $V_1$ or $V_2$ to the inverting terminal of the comparator 501. The signal applied to the noninverting terminal of the comparator 501 or the signal appearing at the junction point of a transistor 507 and a capacitor 513 has a sawtooth waveform which starts resing from the reference voltage $V_1$ and whose peak corresponds to the reference voltage $V_2$. This sawtooth waveform is produced by the capacitor 513 which is charged with the current $I_1$ from a constant current source 503 responsive to the turning on and off of a pair of transistors 506 and 507 controlled via a transistor 508 whose turning on an off are controlled in association with the output of the comparator 501 and which is descharged with a current $(I_2-I_1)$. More specifically, when the transistor 508 is turned on so that the transistors 506 and 507 are turned off, the capacitor 513 is charged with the constant current $I_1$. On the other hand, when the transistor 508 is turned off so that the transistors 506 and 507 are turned on, the constant currents $I_1$ and $I_2(I_2>I_1)$ respectively flow through the transistors 507 and 506 and each of the transistors 507 and 506 pulls the current of the other transistor due to the current mirror effect, thereby causing the capacitor 513 to discharge with the current $(I_2-I_1)$. Since this sawtooth wave signal is applied to the noninverting terminal of the comparator 501, a pulse signal having a predetermined pulse width as shown in FIG. 4 is generated at the output terminal of the oscillator circuit 370 and the time t and the time $(T-t)$ are respectively determined by $$t = \frac{C(V_2 - V_1)}{I_1} \text{ and } (T-t) = \frac{C(V_2 - V_1)}{I_2 - I_1}.$$

Thus, by suitably selecting the value of the reference voltages $V_1$ and $V_2$, the capacitance C of the capacitor 513 and the constant currents $I_1$ and $I_2$, respectively, it is possible to control the driving transistor 352 in accordance with any arbitrary "on" time t and "off" time $(T-t)$.

Next, the operation of the generation indicating circuit 30 will be described. Firstly, when the key switch 50 is closed, the power is supplied to the IG terminal from the battery 60. Since the alternator 10 is not generating as yet so that its output voltage is still lower than a predetermined value, the generator output voltage applied to the P terminal causes all of the transistors 311-1, 311-2 and 311-3 of the generation detecting circuit 310 to remain off and thus the base current flows to the transistors 361 and 354 of the drive circuit 350 whose bases are respectively connected to the collector of the transistors 311-1 and 311-2, respectively, and the transistors 361 and 354 are turned on. When the transistor 354 is turned on, the transistor 355 having its base connected to the collector of the transistor 354 is turned off so that the base of the transistor 352 rises to a high potential and it is turned on. Since the collector of the transistor 352 is connected to the junction of the indicator lamp 40 and the electric load 70 via the L terminal and since the potential at the L terminal drops to a low value in response to the turning on of the transistor 352, the current flows from the IG terminal via the indicator lamp 40, the L terminal and the transistor 352, so that the indicator lamp 40 is turned on indicating that the alternator 10 is not generating. On the other hand, the electric load driving transistor 351 (NPN) connected in series with the transistor 352 and in parallel with the indicator lamp 40 is turned off since the transistor 361 is turned on and the transistor 362 is turned off. Also, with the transistor 311-3 being turned off, the capacitor 321 of the delay circuit 320 is charged via the resistor 322 and its terminal voltage rises, thus turning on the transistors 341 and 345 of the control logic circuit 340. However, the transistor 342 connected in parallel with the transistor 341 and the transistor 347 connected in series with the transistor 345 are turned off since the detection signal applied to their bases from the abnormal voltage detecting circuit 330 is at the low potential indicating that the L terminal voltage is normal. As a result, even if the transistors 344 and 346 are repeatedly turned on and off in response to the pulse signal from the oscillator circuit 370, this on-off signal is not transmitted through the transistors 361 and 352 of the drive circuit 350 to the transistors 351 and 352 which respectively operate the electric load 70 and the indicator lamp 40. As a result, the transistor 352 is continuously held in the on state and the indicator lamp 40 remains on.

Then, in the above-mentioned indicating condition (where the indicator lamp is turned on indicating that the alternator is not generating), if the power supply voltage is erroneously applied to the L terminal or the indicator lamp 40 is short-circuited so that the potential at the L terminal rises and exceeds a preset value Vth or an abnormal voltage detecting level, the transistors 342 and 347 of the control logic circuit 340 each receiving at its base the detection voltage from the abnormal voltage detecting circuit 330, are both turned on thus indicating that the voltage at the L terminal is abnormal (in this nongenerating condition the normal operating condition is represented by the fact that the L terminal potential is low). Also, the transistors 341 and 345 which are respectively connected in parallel and series with the transistors 342 and 347 are on due to the high potential from the delay circuit 320 as mentioned previously. While the pulse signal from the oscillator circuit 370 is applied to the base of the transistors 344 and 346 as mentioned previously, since the transistor 343 connected in series with the transistor 344 is off, the signal resulting from the turning on and off of the transistor 344 is not transmitted to the drive circuit 350. Since the transistors 345 and 347 connected in series with the other transistor 346 are both on, the signal resulting from the turning on and off of the transistor 346 is transmitted to the indicator lamp driving transistor 352 via the transistors 353 and 355 of the drive circuit 350 so that in response to the pulse signal of FIG. 4 the transistor 352 is turned on only during the very short time t and it is turned off during the remaining time $(T-t)$. As a result, the large short-circuit current tending to flow to the transistor 352 due to the abnormal high potential produced at the L terminal is restricted and breaking of the transistor 352 is prevented to protect it.

Further, consider the case where the application of the abnormal voltage is eliminated so that the abnormal condition is eliminated and the normal condition is restored. If the transistor 346 controlled by the pulse signal from the oscillator circuit 370 is not included and if the indicator lamp driving transistor 352 is not controlled so as to be turned on and off, the transistors 351 and 352 are both turned off in response to the occurrence of an abnormal condition. As a result, the voltage at the IG terminal is applied to the series circuit of the indicator lamp 40 and the electric load 70 and the potential at the L terminal assumes a value determined by the ratio between the impedances of the indicator lamp 40 and the electric load 70. If the L terminal potential is lower than the abnormal voltage detecting level (Vth), the abnormal voltage detecting circuit 330 generates no abnormality detection signal and the transistors 342 and 347 connected to the detecting circuit 330 are turned off. Thus, the control logic circuit 340 and the drive circuit 350 are operated in response to the generated output of the alternator 10 which is applied to the P terminal (in this case the alternator is not generating), so that the transistor 351 is turned off and the transistor 352 is turned on, thus restoring the former normal operating condition. On the contrary, if the L terminal potential is higher than the abnormal voltage detecting level, there is in fact a great disadvantage that the abnormal voltage detecting circuit 330 continuously generates an abnormality detection signal so that the driving transistors 351 and 352 respectively associated with the indicator lamp 40 and the electric load 70 remain off and the former normal operating condition is not restored. However, in accordance with the present invention, if the potential at the L terminal is higher than the abnormal voltage detecting level even after the cause of the abnormal condition or the application of the abnormal voltage has been eliminated and the normal condition has been restored, the abnormal voltage detecting circuit 330 detects the L terminal potential as an abnormal potential so that as mentioned previously the indicator lamp driving transistor 352 is subjected to the on-off control by the on-off operation of the transistor 346 controlled by the pulse signal from the oscillator circuit 370. In other words, since the transistor 352 is always turned on during the time t in each period T so that the potential at the L terminal is decreased, the transistor 347 is turned off by the detection voltage from the abnormal voltage detecting circuit 330 and the control signal resulting from the on-off operation of the transistor 346 is not transmitted to the indicator lamp driving transistor 352. As a result, the transistor 352 is continuously turned on in response to the alternator output voltage from the P terminal (in this case the alternator is not generating) and the indicator lamp 40 is turned on, thus restoring the former normal operating condition. While this resetting operation is effected by the fact that the indicator lamp driving transistor 352 is subjected to the on-off control so that it is always turned on during the time t in each period T, due to the transient phenomenon characteristic of the circuit, it does not follow that the resetting is always effected during the first period and thus the length of the period T and the length of the "on" time t are selected such that the resetting is effected as early as possible.

Then, when the engine is started so that the alternator 10 starts generating and the voltage applied to the P terminal reaches a predetermined value, the transistors 311-1, 311-2 and 311-3 are turned on and the transistors 354 and 361 having their bases connected to the collectors of the transistors 311-1 and 311-2 are turned off. The turning off of the transistor 354 turns the transistor 355 on and thus the indicator lamp driving transistor 352 is turned off. The turning off of the other transistor 361 turns the transistor 362 on and consequently the electric load driving transistor 351 (NPN) is turned on. As a result, the potential at the L terminal becomes high so that the indicator lamp 40 is turned off indicating that the alternator 10 is now generating and simultaneously the current flows from the IG terminal to the electric load 70 via the transistor 351 and the L terminal thus operating the electric load 70. At this time, the capacitor 321 of the delay circuit 320 which has been charged before the turning on of the transistor 311-3 starts discharging in response to the turning on of the transistor 311-3 and the transistors 341 and 345 are turned off with the predetermined delay time. Thus, as a result of the turning off of the transistor 341, at the expiration of the predetermined delay time the transistor 342 is turned on and also the transistor 362 is turned off thus tending to turn off the electric load driving transistor 351. However, since the potential at the L terminal has attained by this time a high potential or a normal-condition potential (one which is higher than the previously mentioned abnormal voltage detecting level in the non-generating condition), the abnormal voltage detecting circuit 330 has detected this high potential and the transistor 342 has been turned on. As a result, the transistor 343 is not turned on and the transistor 351 remains in the on state thus continuously operating the electric load 70. On the other hand, while the transistor 345 was turned off with the predetermined delay time as mentioned previously, since the transistor 311-2 connected in parallel with the series circuit of the transistors 346, 345 and 347 has been turned on as mentioned previously, the operation of this series circuit has no effect on the operation of the transistor 354.

In the above-mentioned electric load driving condition (or the alternator generating condition), if the negative side of the power supply contacts the L terminal accidentally or the electric load 70 is short-circuited, the potential at the L terminal becomes lower than the abnormal voltage detecting level. In the electric load driving condition, the normal potential at the L terminal is higher than the detecting level (Vth) so that when the potential drops below the detecting level, the abnormal voltage detecting circuit 330 detects this low voltage and the transistors 342 and 347 are each switched from the on state to the off state thus indicating the abnormal voltage at the L terminal. When the transistor 342 is turned off, since the transistor 341 connected in parallel with the transistor 342 is also off as mentioned previously, the potential at the base of the transistor 343 becomes high and it is turned on. As a result, the on-off operation of the transistor 344 controlled in response to the pulse signal (FIG. 4) of the oscillator circuit 370 is transmitted to the electric load driving transistor 351 via the transistor 362 and the transistor 351 is controlled to turn it on and off. If this case, while the transistor 346 is also controlled by the oscillator circuit 370, since the operation of the series circuit including the transistor 346 has no effect on the operation of the transistor 354, the indicator lamp driving transistor 352 is also not affected and it remains off. Since the transistor 351 is turned on only during the time t in each on-off control cycle or period T and it is turned off during the remaining time (T−t), the short-circuit current flowing through the transistor 351 is limited and the transistor 351 is protected from breaking due to any excessive short-circuit current.

Next, consider the case in which the above-mentioned abnormal condition is eliminated and the normal condition is restored. When an abnormal condition occurs, the transistor 351 is turned on during the very short period of time in each period and the transistor 352 is turned off. As a result, even when the abnormal low potential at the L terminal of the short-circuit condition is eliminated, the current flows to the series circuit of the indicator lamp 40 and the electric load 70 from the IG terminal and thus the potential at the L terminal has a value dependent on the ratio between the impedances of the indicator lamp 40 and the electric load 70 as mentioned previously. As a result, if this potential is higher than the detecting level (Vth), the potential is detected as a normal potential by the abnormal voltage detecting circuit 330 so that the transistor 342 is turned on and the transistor 343 is turned off. Consequently, the on-off operation of the transistor 344 controlled by the oscillator circuit 370 is not transmitted to the electric load driving transistor 351 via the transistor 362, so that in accordance with the generated output of the alternator 10 applied to the P terminal (in this case the alternator is generating) the transistor 351 is turned on and the transistor 352 is turned off, thus restoring the normal operating condition. On the contrary, if the L terminal potential which is dependent on the impedance ratio is lower than the detecting level (Vth), the abnormal voltage detecting circuit 330 detects this potential as an abnormal potential and thus the transistor 342 is turned off. If there is no provision of the transistor 344 controlled by the oscillator circuit 370, the transistor 351 will remain off and the normal operating condition will not be restored. However, in accordance with the present invention, by virtue of the transistor 344 controlled by the oscillator circuit 370, in the same manner as mentioned previously the electric load driving transistor 351 is controlled through the transistor 362 so that the transistor 351 is turned on during the time t and turned off during the time (T−t) in each period T of the pulse signal from the oscillator circuit 370. Thus, due to the turning on of the transistor 351 during the time t, the potential at the L terminal rises up to the voltage at the IG terminal. As a result, L terminal potential exceeds the detecting level so that the potential is detected as a normal potential by the abnormal voltage detecting circuit 330 and the transistor 342 is turned on. Thus, the electric load driving transistor 351 is continuously turned on and the normal operating condition is restored. In this way, if the L terminal potential becomes abnormally low, the transistor 351 is switched to the on-off control to prevent its breaking and also the normal operating condition is automatically restored upon elimination of the abnormal potential.

Figure 5:
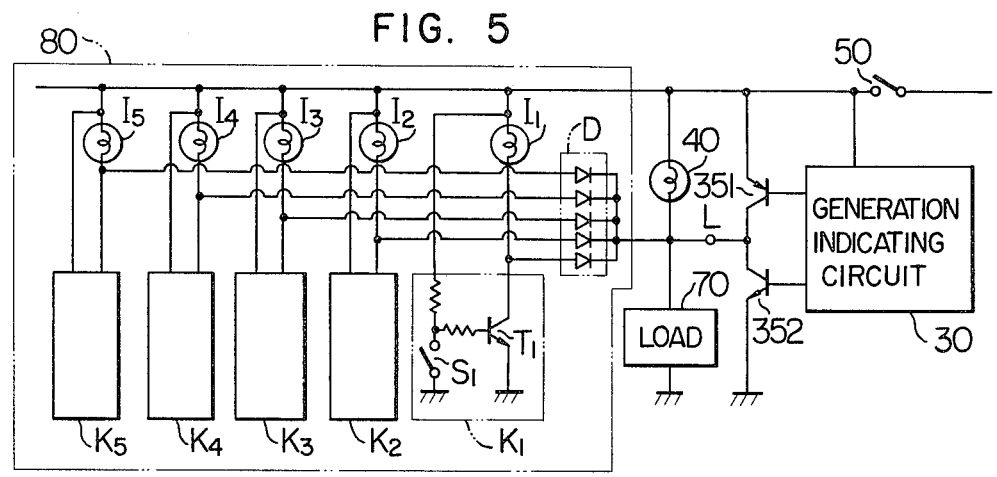
FIG. 5 is a circuit diagram showing a monitor circuit section.

The above-mentioned reset function is performed when an abnormally high or low potential is applied to the L terminal accidentally or due to a fault in the nongenerating or generating condition. However, this reset function can be performed very effectively even in the normal operating conditions. For example, it can be used very effectively in cases where a plurality of indicator lamps are connected as a monitor apparatus in parallel with the generation indicator lamp 40 such that when any of the components or the functions having important bearing on the safe driving of the vehicle shows a tendency to become faulty or abnormal, the associated indicator lamp is turned on in response to the information from the associated sensor and the driver is alerted to the fault. As indicated at reference numeral 80 in FIG. 5, the monitor apparatus includes indicator lamps $I_1$ to $I_5$ which are each associated with one of the components and functions whose abnormal or faulty conditions are to be detected and these indicator lamps are respectively controlled by control circuits $K_1$ to $K_5$ each including a sensor S ($S_1$ ...) and a transistor T ($T_1$ ...). The sensor S is of the normally closed type so that when a fault is detected, the sensor S is opened and the transistor T is turned on, thus turning the indicator lamp I on. In this case, the indicator lamps $I_1$ to $I_5$ are each connected in parallel with the indicator lamps 40 through a diode circuit D so that all the indicator lamps of the monitor are turned on when the potential at the L terminal becomes low. As a result, when the key switch is turned on so that as mentioned previously the transistor 352 is turned on and the potential at the L terminal becomes low thus turning the indicator lamp 40 on, the monitor indicator lamps $I_1$ to $I_5$ are all turned on irrespective of whether the associated fault detecting points are normal or faulty. Thereafter, as the alternator 10 starts generating so that the transistor 352 is turned off and the transistor 351 is turned on as mentioned previously, all the indicators 40 and $I_1$ to $I_5$ are turned off. In this case, if there is any faulty component or function, the associated normally closed sensor S is opened and the associated transistor T is turned on, thus turning on only the corresponding one of the indicator lamps $I_1$ to $I_5$.

Figure 6A:
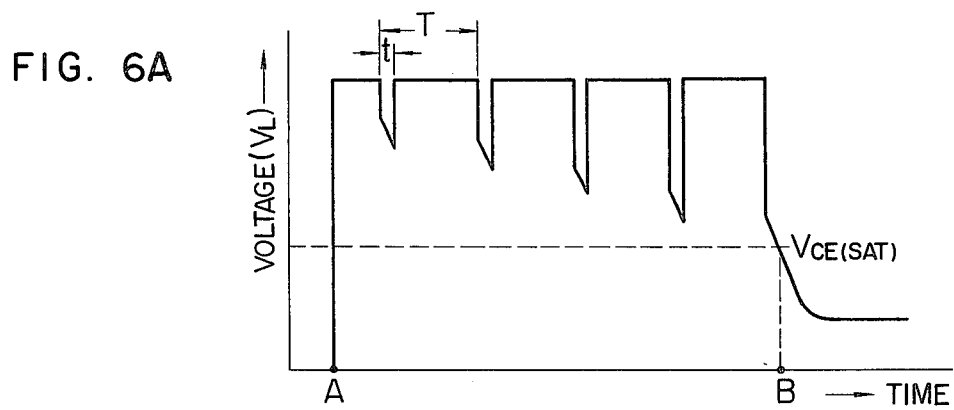
FIGS. 6A to 6C show a plurality of waveforms of rush current, etc., generated when the monitor circuit is used.
Figure 6B:
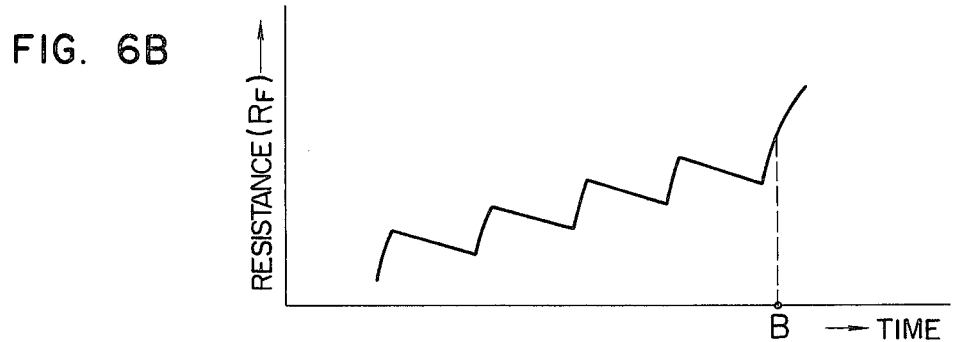
Figure 6C:
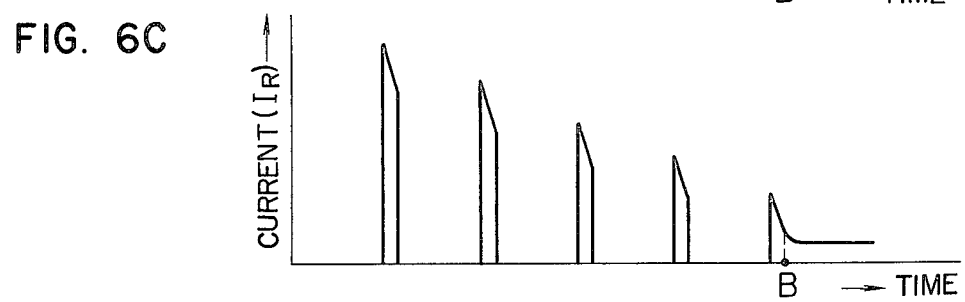

Referring also to FIGS. 6A to 6C, consider the case when the key switch 50 is closed. In this case, the indicator lamps 40 and $I_1$ to $I_5$ are all turned on and a current of several tens ampers flows as a rush current to the indicator lamp driving transistor 352 at a moment A at which the key switch 50 is closed, for example. Thus, as shown in FIG. 6A, the collector-emitter saturation voltage $V_{CE(SAT)}$ becomes as high as ten-odd volts and exceeds the detecting level (Vth). This phenomenon corresponds to the previously mentioned case where in the generating condition the generation indicator lamp 40 is short-circuited so that a high voltage $V_1$ is applied to the L terminal and the transistor 352 is turned off to protect it. As a result, if no reset function is provided, the transistor 352 is turned off when the presence of an abnormal potential is detected by the abnormal voltage detecting circuit 330 and consequently the generation indicator lamp 40 cannot be turned on permanently even when the indicator lamp 40 is to be turned on to indicate the nongenerating condition. However, in accordance with the present invention the transistor 352 is turned on only during the time t in each period T and the current flows to the indicator lamps 40 and $I_1$ to $I_5$ only during the time t. As a result, the rush current $I_R$ flows to the transistor 352 as shown in FIG. 6C. In this case, each of the indicator lamps $I_1$ to $I_5$ generates heat due to the current flowing only during the time t in each period T and the generated heat is gradually stored, thus increasing the resistance of its filament with time in a stepwise fashion as shown in FIG. 6B. As a result, the rush current $I_R$ flowing to the transistor 352 during the time t in each of the successive periods T is decreased gradually so that as shown in FIG. 6A, the saturation voltage $V_{CE(SAT)}$ of the transistor 352 corresponding to each rush current or the rapid slot-like drop of the L terminal voltage $V_L$ during each time t is gradually increased. Thus, when the voltage $V_L$ becomes lower than the detecting level Vth at a point B, as mentioned previously, the operation of the protective circuit is released and the normal operating condition is restored, thus turning the indicator lamp 40 on.

We claim:

1. A generation indicating apparatus in a charging system having an alternator, a voltage regulator and a battery, said generation indicating apparatus comprising:
 a generation detecting circuit connected to receive an output of said alternator for determining a generation condition of said alternator and for producing a detection signal when the generation condition reaches a predetermined condition after the start of an engine;
 indicator means for indicating the generation condition of said alternator;
 a drive circuit including a drive transistor circuit for operating said indicator means, said drive circuit having an input terminal connected to said generation detecting circuit and an output terminal connected to said indicator means, said drive circuit operating said indicator means to indicate that said alternator is in a non-generating condition until said detection signal is received from said generation detecting circuit and to indicate that said alternator is in a generating condition after said detection signal is received; and a protection and reset circuit for forcedly stopping the operation of said drive circuit upon occurrence of an abnormal voltage on a line connected between said output terminal of said drive circuit and said indicator means and for resetting said drive circuit to recover a normal operation after said abnormal voltage is removed, said protection and reset circuit including an abnormal voltage detecting circuit for detecting said abnormal voltage on said line, an oscillator circuit for producing a pulse signal having predetermined on and off periods, and a control circuit connected to said abnormal voltage detecting circuit, said oscillator circuit and said drive circuit and for providing said pulse signal as a control signal to said drive circuit thereby to turn on and off said drive transistor of said drive circuit upon detection of said abnormal voltage by said abnormal voltage detecting circuit, wherein the conduction of said drive transistor is limited to the on period of said pulse signal to protect said drive transistor and said abnormal voltage is gradually removed through the conduction of said drive transistor.

2. An apparatus according to claim 1, wherein said oscillator circuit in said protection and reset circuit includes a comparator having an inverting input terminal applied with first and second reference voltages alternately by varying a voltage dividing ratio of a voltage divider connected to said inverting input terminal, said comparator having a noninverting input terminal applied with a sawtooth wave signal formed by charging and discharging a capacitor connected to said noninverting terminal by third and fourth current, wherein said pulse signal produced by said oscillator circuit having the on period and off period determined by said first and second reference voltages, said capacitor, and said third and fourth currents.

3. An apparatus according to claim 1, wherein said indicator means is an indicator lamp having one terminal connected to said battery through said key switch and having the other terminal connected to said line leading to a drive transistor of said drive circuit, and said generation indicating apparatus further comprises a monitor device having a plurality of monitor lamps connected in parallel with said indicator lamp, and wherein said indicator lamp and said plurality of monitor lamps are turned on simultaneously upon closing said key switch and an abnormal voltage of high level is produced on said line due to a high collector-emitter saturation voltage, $V_{CE(SAT)}$, of said drive transistor of said drive circuit caused by a rush current flowing said indicator lamps, said monitor lamps and said drive transistor, said protection and reset circuit detects said abnormal voltage of high level on said line to control said drive transistor of said drive circuit by said pulse signal from said oscillator circuit having on and off periods thereby to reset said drive circuit to the normal operation.

4. A generation indicating apparatus in a generating and charging system having a vehicle alternator, a voltage regulator, a key switch and a battery, said generation indicating apparatus comprising:

a generation detecting circuit having an input terminal connected to said alternator to receive an AC output and producing a generation detection signal indicating whether a voltage built up by said alternator after closing said key switch has reached a predetermined level or not;

an indicator lamp connected in series with an electric load, said series circuit of said indicator lamp and said electric load being connected to said battery via said key switch;

a drive circuit for operating said indicator lamp, said drive circuit including an electric load drive transistor and an indicator lamp drive transistor connected in series with each other, the series circuit of said drive transistors being connected in parallel with the series circuit of said indicator lamp and electric load, a junction point between said electric load drive transistor and said indicator lamp drive transistor constituting an output terminal of said drive circuit and being connected through a line to a junction point between said indicator lamp and said electric load;

an abnormal voltage detecting circuit including a voltage divider connected to said line between the output terminal of said drive circuit and the junction point of said indicator lamp and said electric load, said voltage divider producing an output signal having a voltage level corresponding to a voltage on said line;

an oscillator circuit for producing a pulse signal having predetermined on and off periods; and a control logic circuit having input terminals for respectively receiving said generation detection signal from said generation detecting signal, said output voltage from said abnormal voltage detecting circuit and said pulse signal from said oscillator circuit, said control logic circuit producing a control signal to said drive circuit depending on said signals applied to said input terminals in that when said output signal from said abnormal voltage detecting circuit is of normal voltage level, said pulse signal from said oscillator circuit is prevented from entering into said drive circuit and the control signal is delivered to said drive circuit to turn on either said electric load drive transistor or said indicator lamp drive transistor depending on whether said generation detecting signal is indicating that the voltage built up by said alternator has reached the predetermined level or not, and when said abnormal voltage detecting circuit produces said output signal of an abnormal voltage level different from the normal voltage level, said pulse signal from said oscillator circuit is delivered to said drive circuit as the control signal to control either said indicator lamp drive transistor or said electric load drive transistor depending on whether said generation detection signal is indicating that the voltage built up by said alternator has not reached the predetermined level or not, said indicator lamp drive transistor or said electric load drive transistor under the control of said pulse signal being turned on only during the predetermined on period of said pulse signal thereby to limit a current flowing through said either transistor caused by the abnormal voltage on said line and thereby to ensure restoration of the operation of said drive circuit to a normal operation after the abnormal voltage is removed.

* * * * *